US00RE48283E

(19) United States
(12) Reissued Patent
Stroud

(10) Patent Number: US RE48,283 E
(45) Date of Reissued Patent: Oct. 27, 2020

(54) METHOD AND APPARATUS TO REDUCE THE NUMBER OF SPERM USED IN ARTIFICIAL INSEMINATION OF CATTLE

(71) Applicant: Brad Stroud, Dennis, TX (US)

(72) Inventor: Brad Stroud, Dennis, TX (US)

(21) Appl. No.: 16/261,730

(22) Filed: Jan. 30, 2019

Related U.S. Patent Documents

Reissue of:
(64) Patent No.: 9,554,883
Issued: Jan. 31, 2017
Appl. No.: 13/814,458
PCT Filed: Aug. 10, 2010
PCT No.: PCT/US2010/045028
§ 371 (c)(1),
(2) Date: Jul. 3, 2013
PCT Pub. No.: WO2012/021127
PCT Pub. Date: Feb. 16, 2012

(51) Int. Cl.
*A61D 19/02* (2006.01)
*A61D 19/00* (2006.01)

(52) U.S. Cl.
CPC ..... *A61D 19/027* (2013.01); *A61D 19/00* (2013.01); *A61D 19/02* (2013.01)

(58) Field of Classification Search
CPC ..... A61D 19/02; A61D 19/027; A61M 31/00
USPC ..... 600/35; 604/515
See application file for complete search history.

(56) References Cited

U.S. PATENT DOCUMENTS 2,566,632 A 9/1951 Propp
2,944,541 A 7/1960 Sacchi et al.
3,256,884 A 6/1966 Hill et al.
3,343,539 A * 9/1967 Moorhouse ..... A61D 19/027 604/211
3,811,423 A 5/1974 Dickinson, III et al.
3,811,443 A 5/1974 Dickinson, III et al.
(Continued)

FOREIGN PATENT DOCUMENTS

CA 1073286 3/1980
EP 0071538 9/1983
(Continued)

OTHER PUBLICATIONS

Amann, Rupert P., Exposure of Thawed Frozen Bull Sperm to a Synthetic Peptide Before Artificial Insemination Increases Fertility, Journal of Andrology, (1999), 42-46, vol. 20, No. 1.
(Continued)

*Primary Examiner* — Cary E Wehner
(74) *Attorney, Agent, or Firm* — Craig R. Miles; CR Miles P.C.

(57) ABSTRACT

The present artificial insemination instrument may include a single use, hollow, elongate, metal pipette and a single disposable syringe that is not toxic to bovine sperm. The apparatus is used with any type of diluent that is not toxic to bovine sperm. In various embodiments, a technician may use non-sorted reduced sperm count semen straws from a bull stud, cut an unsorted semen straw into several pieces to use one piece at a time per cow, thaw one straw and mix the non-sorted semen with diluent, or use reduced sperm count semen straws filled with sex sorted semen by the manufacturer. A procedure is disclosed to use the artificial insemination instrument, reduced sperm count semen from any of the aforementioned sources, a non-toxic syringe, and a diluent to achieve conception rates at least as good as conventional prior art device and procedure conception rates.

18 Claims, 5 Drawing Sheets

(56) References Cited

U.S. PATENT DOCUMENTS

| | | | | |
|---|---|---|---|---|
| 3,877,430 | A | 4/1975 | Wieder | |
| 3,889,676 | A | 6/1975 | Greene | |
| 3,910,275 | A | 10/1975 | Babey et al. | |
| 4,301,797 | A | 11/1981 | Pollack | |
| 4,305,392 | A | 12/1981 | Chester | |
| 4,324,235 | A | 4/1982 | Beran | |
| 4,335,723 | A | 6/1982 | Patel | |
| 4,419,986 | A | 12/1983 | Leibo | |
| 4,457,313 | A | 7/1984 | Alter | |
| 4,493,700 | A | 1/1985 | Cassou et al. | |
| 4,654,025 | A | 3/1987 | Casson et al. | |
| 4,780,451 | A | 10/1988 | Donaldson | |
| 5,030,202 | A | 7/1991 | Harris | |
| 5,147,299 | A | 9/1992 | Mendoza et al. | |
| 5,147,315 | A | 9/1992 | Weber | |
| 5,496,272 | A | 3/1996 | Chung et al. | |
| 5,904,665 | A | 5/1999 | Muharib | |
| 5,916,144 | A | 6/1999 | Li et al. | |
| 5,985,538 | A | 11/1999 | Stachecki | |
| 6,071,231 | A | 6/2000 | Mendoza et al. | |
| 6,130,034 | A | 10/2000 | Aitken | |
| 6,140,121 | A | 10/2000 | Ellington et al. | |
| 6,368,786 | B1 | 4/2002 | Saint-Ramon et al. | |
| 6,403,631 | B1 * | 6/2002 | Sharp et al. | 514/415 |
| 6,454,756 | B1 | 9/2002 | Sasaki | |
| 6,551,236 | B1 | 4/2003 | Liegois | |
| 6,569,118 | B2 | 5/2003 | Johnson et al. | |
| 7,056,279 | B2 | 6/2006 | Verberckmoes et al. | |
| 7,339,090 | B2 | 3/2008 | Christmann | |
| 2002/0038113 | A1 | 3/2002 | Gourley et al. | |
| 2002/0072650 | A1 | 6/2002 | Garcia et al. | |
| 2003/0008918 | A1 | 1/2003 | Kurogi et al. | |
| 2003/0196213 | A1 | 10/2003 | Matthijs-Rijsenbilt et al. | |
| 2004/0031071 | A1 | 2/2004 | Morris et al. | |
| 2004/0199044 | A1 | 10/2004 | Verberckmoes et al. | |
| 2004/0261799 | A1 | 12/2004 | Mock | |
| 2005/0064579 | A1 | 3/2005 | Loskutoff et al. | |
| 2005/0214733 | A1 | 9/2005 | Graham et al. | |
| 2006/0079731 | A1 | 4/2006 | Chen | |
| 2007/0197996 | A1 * | 8/2007 | Kraft et al. | 604/500 |
| 2007/0255091 | A1 * | 11/2007 | Ainley, Jr. | A61D 19/027 600/35 |
| 2009/0023980 | A1 | 1/2009 | Ainley, Jr. | |
| 2009/0030268 | A1 | 1/2009 | Stroud | A61D 19/027 600/35 |
| 2009/0281371 | A1 * | 11/2009 | Stroud | 600/35 |
| 2010/0179377 | A1 * | 7/2010 | Hagby | 600/33 |
| 2010/0191041 | A1 * | 7/2010 | Li et al. | 600/35 |

FOREIGN PATENT DOCUMENTS

| | | |
|---|---|---|
| EP | 214043 | 3/1987 |
| EP | 0538786 | 4/1993 |
| EP | 0685556 | 6/1995 |
| FR | 2647668 | 12/1990 |
| FR | 2720407 | 1/1995 |
| GB | 867274 | 5/1964 |
| GB | 1488397 | 10/1977 |
| GB | 2031456 | 4/1980 |
| WO | 9103935 | 4/1991 |
| WO | 9428810 | 12/1994 |
| WO | WO 2010041921 A1 * | 4/2010 |

OTHER PUBLICATIONS

Barth, AD, Factors Affecting Fertility with Artificial Insemination, Vet. Clin. North Am. Food Anim. Pract. (1993), 275-89, 9(2).

Berber, et al., Comparison of Two Ovsynch Protocols (Gnrh Versus LH) for Fixed Timed Insemination in Buffalo (Bubalus Bubalis), Theriogenology (2002), 1421-30, 57(5).

Bergqvist, Ann-Sofi, et al, Sulphated Glycosaminoglycans (S-GAGs) and Syndecans in the Bovine Oviduct, Animal Reproduction Science 93, (2006) 46-60.

Betieridge, K.J., An Historical Look at Embryo Trnasfer, J. Reprod. Fert., (1981), 62, 1-13.

Block, J., et al., Effect of Addition of Hyaluronan to Embryo Culture Medium on Survival of Bovine Embryos in Vitro Following Vitrification and Establishment of Pregnancy After Transfer to Recipients, Theriogenology, (2009), on-line publication of 9 pages.

Bracken, Benjamin G., Fertilization and Early Development of Cow Ova, Biology of Reproduction 23 (1980), 189-205.

Dairy Herd Staff, Reproductive Efficiency=Environmental Efficiency, Dairy Herd Management, (2009).

Dalton et al., Effect of a Deep Uterine Insemination on Spermatozoal Accessiblity to the Ovum in Cattle: A Competitive Insemination Study, Theriogenology (1999), 883-890, vol. 51, Iss. 5.

Dalton, Joseph C., Factors Important to the Efficiency of Artificial Insemination in Single-Ovulating and Superovulated Cattle, Dissertation submitted for degree of Doctor of Philosophy in Animal Science, (1999).

DeJarnetie, J.M., et al., Accessory Sperm: Their Importance to Fertility and Embryo Quality, and Attempts to Alte Their Numbers in Artificially Inseminated Cattle, J. Anim. Sci. (1992), 70:484-491.

Foote, R.H., The History of Artificial Insemination: Selected Notes and Notables, American Society of Animal Science, (2002), 1-10.

Furmus, et al, Effect of Hyaluronic Acid on Development of In Vitro Produced Bovine Embryos, Centro de Investigaciones Reproductivas Perez Companc, Theirogenology (1998), 49:1489-1499.

Gao, Q.H, et al., Successful Low Dose Insemination of Flow Cytometrically Sorted Sika (*Cervus nippon*) Sperm in Wapiti (*Cervus elaphus*), Animal Reproduction Science, (2009).

George, F., et al., Set Up of a Serum-Free Culture System for Bovine Embryos: Embryo Development and Quality Before and After Transient Transfer, Theriogenology 69, (2008), 612-623.

Graves, et al., Evaluation of Uterine Body and Bilteral Uterine Horn Insemination Techniques, J. Dairy Sci. (1991) 3454-6, 74(10).

Hartman, Carl G., et al, First Findings ofTubal Ova in the Cow, Together with Notes on Oestrus, The Anatomical Record, (1931) 267-275, vol. 48, No. 2.

Hawk, H.W., Transport and Fate of Spermatozoa After Insemination of Cattle. Journal of Dairy Science , (1987), pp. 1487-1503, vol. 70, No. 7.

Hawk, H.W., et al, Effect of Unilateral Cornual Insemination upon Fertilization Rate in Superovulating and Single-Ovulating Cattle. J. Anim. Sci, (1986), 63:551-560.

Hawk, H.W., Sperm Survival and Transport in the Female Reproductive Tract, J Dairy Sci (1983) 66:2645-2660.

Heiskanen et al., Insemination Results with Slow-Cooled Stallion Semen Stored for 70 or 80 Hours, Theriogenology (1994), 1043-1051, vol. 42., Iss. 6.

Hunter, RH; Advances in Deep Uterine Insemination: A Fruitful Way Forward to Exploit New Sperm Technologies in Cattle, Anim Reprod Sci., (2003) 157-170, 79(3-4).

Hunter et al., Deep Uterine Insemination of Cattle: A Fruitful Way Forward with Smaller Number of Spermatozoa, Acta Vet Scand. (1998), 149-63, 39(2).

Hunter, R.F.H., et al., Sperm Transport in the Cow: Periovulatory Redistribution of Viable Cells Wtihin the Oviduct, Reprod. Nutr Develop., 24: (1984), 597-608.

Januskauskas, A., et al, Relationship Between Sperm Response to Glycosaminoglycans In Vitro and Non-Return Rates of Swedish Dairy A1 Bulls, Reprod Dom Anim 35, (2000), 207-212.

Kurykin, et al., Fixed Time Deep IntracornuallInsemination of Heifers at Synchronized Estrus, Theirogenology (2003), 1261-8; 60(7).

L6pez-Gatius, F., et al., Intraperitoneal Insemination and Retrograde Sperm Transprt in Dairy Cows, J. Vet. Med. A 47, (2000), 83-88.

MacPherson. J.W., Semen Placement Effects on Fertility in Bovines, J. Dairy Science, (1968) 807-808, vol. 51, No. 5.

Mitchell, J.R., Distribution and Retention of Spermatozoa with Acrosomal and Nuclear Abnormalities in the Cow Genital Tract. J. Amin. Sci., (1985), 61:956-967.

Munkittrick, T.W., Accessory Sperm Numbers for Cattle Inseminated with Protamine Sulfate Microcapsules, J. Dairy Sci. (1992), 75:725-731.

(56) References Cited

OTHER PUBLICATIONS

Nebel, et al, Microencapsulation of Bovine Spermatozoa for Use in Artificial Insemination: A Review, Reproduction, Fertility and Development (1993), 701-712, 5(6).
Nebel et al. Microencapsulation of Bovine Spermatozoa, J. Anim Sci (1985), 60:1631-1639.
Nizanski, Wojciech, Intravaginal Insemination of Bitches with Fresh nd Frozen-Thawed Semen with Addition of Prostatic Fluid: Use of an Infusion Pipette and the Osiris Catheter, Theriogenology, (2006), 470-483, vol. 66, Iss 2.
Palasz, A.T., et al., Effects of Hyaluronan, BSA, and Serum on Bovine Embryo In Vitro Development, Ultrastructure, and Gene Expression Patterns, Molecular Reproduction and Development (2006), 73: 1503-1511.
Peippo, J. et al., Embryo Production From Superovulated Holstein-Friesian Dairy Heifers and Cows After Insemination With Frozen-Thawed Sex-Sorted X Spermatozoa or Unsorted Semen, Anim Reprod Sci. (2009), 111(1); 80-92.
Pena, F.J., et al., Effect of Hyaluronan Supplementation on Boar Sperm Motility and Membrane Lipid Architecture Status After Cryoperservation, Theriogenology 61 (2004), 63-70.
Ranganathan, Sripriya et al, Evidence for Presence of Hyaluronan Binding Protein on Spermatozoa and Its Possible Involvement in Sperm Function, Molecular Reproduction and Development (1994) 38:69-76.
Rodriguez-Martinez, H., Role of the Oviduct in Sperm Capacitation, Theriogenology 68S, (2007), S138-S146.
Saacke, R.G., et al., Involvement of the Bull and Inseminate in Fertility and Embryo Quality, AET Convention. (1994), 43-55.
Saacke, R.G., What Happens to All Those Sperm?: The Interation of Male and Female in Success of Mating, Theriogenology (2004), Lexington, KY.
Salisbury, G.W., et al., Preservation of Bovine Spermatozoa in Yolk-Citrate Diluent and Field Results From Its Use, Journal of Dairy Science, (1941), 905-910, vol. XXIV, No. 11.
Salisbury, G.W., et al., Further Studies of the Effect of Dilution Rate on the Fertility of Bull Semen Used for Artificial Insemiantion, (1944) 233-241.
Salisbury, G.W., Fertility of Bull Semen Diluted at 1:100, J. Dairy Sci. (1946), 695-697.
Salisbury, G.W., et al., Fertility Level of Bull Semen Diluted at 1:400 With and Without Sulfanilamide, (1948), 817-822.
Schenk, J.L., et al., Effects of Extender and Insemination Dose on Postthaw Quality and Fertility of Bovine Sperm, J Dairy Sci 70 (1987), 1458-1464.
Sieme, et al., Effects of Different Artificial Insemination Techniques and Sperm Doses on Fertility of Normal Mares and Mares with Abnormal Reproductive History, Theriogenology, (2004), 915-928, vol. 62, Iss. 5.
Sirard, M.-A, et al., In Vivo and In Vitro Effects of Fsh on Oocyte Maturation and Developmental Competence, Theriogenology 68S, (2007) S71-S76.
Suarez, S.S., Interactions of Spermatozoa with the Female Reproductive Tract: Inspiration for Assisted Reproduction, Reproduction, Fertility and Development, (2007), 19, 103-110.
Talbot, Prudence, et al., Cell Adhesion and Fertilization: Steps in Oocyte Transport, Sperm-Zona Pellucida Interactions, and Sperm-Egg Fusion, Biology of Reproduction 68, (2003), 1-9.
Tanabe, T.Y., The Nature of Reproductive Failure in Cows of Low Fertility, Wisconsin Agricultrual Experiment Station, (1948), Paper No. 383, 237-246.
Tanghe, Sofie, et al., Cumulus Contributions During Bovine Fertilization In Vitro, Theriogenology 60, (2003), 135-149.
Testing Committee Report, Abstracts of Papers Presented at the Thirty-Seventh Annual Meeting, (1942), 667-731.
Van Soom, et al., Deep Intrauterine Insemination in Cattle, Gynecologie, Obstetrique & Fertilite, (2004), 32 (10): 911-5.
Vandemark, N.L., Sperm Transport in the Perfused Genital Tract of the Cow, Am. J. Physiol (1955),183: 510-512.
Verberckmoes et al., Assessment of a New Utero-Tubal Junction Insemination Device in Dairy Cattle, Theriogenology, (2004), 103-115, vol. 61, Iss. 1.
Verberckmoes et al., Low Dose Insemination in Cattle with the Ghent Device, Theirogenology, (2005) 1716-1728, vol. 64, Iss. 8.
Verberckmoes, Steven; Preservation of Fresh Bovine Semen and Utero-Tubal Junction Insemination in Cattle, de Faculteit Diergeneeskunde, Universiteit Gent (2004), Thesis.
Weeth, H.J., et al., Comparative Efficiency of Intracervical and Intra-Uterine Methods of Insemination in Dairy Cattle, Dept. of Dairy Husbandry, Missouri Agricultural Experiment Station Journal, (1950) 195-198, Series No. 1224.
Wilmut, I., et al., Sperm Transport into the Oviducts of Heifers Mated Early in Oestrus, Reprod. Nutr. Develop., (1984), 24 (4), 461-468.

* cited by examiner

METHOD AND APPARATUS TO REDUCE THE NUMBER OF SPERM USED IN ARTIFICIAL INSEMINATION OF CATTLE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a U.S. National Phase Application of International Application PCT Application No. PCT/US10/45028 filed on Aug. 10, 2010. The disclosures of International Application PCT Application No. PCT/US10/45028 are incorporated herein by reference.

BACKGROUND OF THE INVENTION

Most dairy cattle are bred using conventional artificial insemination (AI) techniques resulting in conception rates of approximately 20-40%. Frozen semen straws are used in conventional AI techniques, each holding approximately 20 million unsorted sperm. In comparison, a bull in a pasture deposits billions of sperm each time he mates with a cow or a heifer. Further, the bull is not shy about repeatedly mating with a female while she is in heat, further increasing the enormous number of sperm and the large volume of semen in the reproductive system of a female bovine.

Dairy cattle bulls have been bred to sire females that produce the most milk. These desirable bulls are developed and raised on ranches that are typically referred to in the industry as "Bull Studs". The dairy industry is very picky about the genetics of the bulls which produce the sperm used in conventional semen straws. Semen from these desirable bulls is collected at the Bull Stud and packaged in the frozen semen straws for sale to cattle owners and others. In 2010, there were approximately 25-30 Bull Studs in the U.S. producing frozen semen straws for the dairy and beef industry. But market demand for semen straws from the top bulls exceeds the natural supply. (A bull can only produce so much sperm during the course of a year.)

Intuitively, a reduction in the number of sperm in a semen straw would lower conception rates using conventional AI techniques. But, the inventor has developed a new technique to reduce the number of sperm required for impregnation of a female while at least maintaining conception rates comparable to conventional AI techniques (approximately 20-40% in dairy cattle). As a result, the Bull Studs may sell more semen straws over time from a single bull with superior genetics. This could allow dairymen to breed more of their cows with sperm from the most desirable bulls.

Some bovine semen is sex sorted. Current sex sorting technology is relatively slow. Therefore, sex-sorted straws contain a fraction of the number of sperm found in a conventional unsorted semen straw. For example, to deliver a straw with a 90% female offspring expectation it is current practice to place a minimum of 2.1 million sorted sperm in a straw. In addition, sorted semen may contain more sperm but have a reduced female offspring expectation. The speed of the sorting process is inversely related to the accuracy of the machine's ability to sort by sex. (The faster the machine sorts, the less accurate it becomes in determination of the sex of the semen.) In the case of sex-sorted semen, the minimum number of sperm suitable for use in conventional AI techniques is 2.1 million sperm with a 90% female offspring expectation; although this number is subject to change if the sorting technology improves. Using the present invention, less than 2.1 million sex-sorted sperm will be suitable for artificial insemination of a female, with a 90% female offspring expectation. Sex sorted sperm are not always packaged in a straw with 2.1 million sperm.

Over the years, Brad Stroud, DVM has been trying to develop ways to increase conception rates in the dairy and beef industry. Two prior U.S. patent applications filed by Dr. Stroud aim to increase the overall conception rates of beef and dairy cattle: "Artificial Breeding Techniques for Bovines including Semen Diluents and AI Apparatus" Ser. No. 11/829,240 filed on Jul. 27, 2007 and "Artificial Breeding Techniques for Bovines Including Semen Diluents and AI Apparatus" Ser. No. 12/506,723 filed on Jul. 21, 2009. These two prior patent applications used conventional frozen semen straws containing approximately 20 million sperm and sex sorted semen. Neither of these two prior patent applications addressed the shortage of sperm from desirable bulls. These two prior patent applications claim to increase conventional conception rates of cattle that have been artificially inseminated using the methods disclosed therein.

In contrast, the present patent application, also by Dr. Stroud, does not promise increased conception rates. Instead, the present invention offers conception rates that are at least comparable to conventional AI techniques (For example, approximately 20-40% in dairy cattle). The present invention will significantly reduce the number of sperm from desirable bulls used in each semen straw, allowing more cows to take advantage of a precious resource that is limited by natural production.

Conventional artificial insemination devices are well known to those skilled in the art, such as the prior art AI device shown in FIG. 1 herein. FIG. 1 is not to scale and is for illustrative purposes only for a reader that has never seen the actual apparatus. This metal and plastic AI device has a non-disposable hollow metal barrel with a metal plunger sliding to and fro inside the hollow metal barrel and a disposable plastic sheath. The distal end of the barrel has a receptacle sized to receive a semen straw. Conventional semen straws are crimped on one end and have a cotton plug in the other end. To use the semen straw with the prior art AI instrument of FIG. 1, the straw is warmed and then the crimped end is cut. The cotton plug end of the semen straw is placed in the receptacle of the conventional prior art AI device. The metal plunger contacts the cotton plug.

This prior art metal and plastic non-disposable AI device and the semen straw are inserted into a disposable elongate plastic sheath. For this reason the conventional AI instrument in FIG. 1 is referred to as a "metal and plastic" apparatus. In this conventional AI instrument, the cut end of the semen straw engages the plastic sheath, forming a seal to prevent semen leaks. Prior art sheaths of this design are well known to those skilled in the art. This prior art metal and plastic device is inserted into cow's reproductive organs. No diluent is used. Then the AI Technician pushes on the metal plunger which pushes the cotton plug through the semen straw and forces the semen out of the tip of the AI device. The cotton plug is not injected into the cow because it is trapped by the seal on the plastic sheath. But the cotton plug does absorb some of the semen which is lost and not able to fertilize the female. The present invention has a more simple solution, with a disposable non-toxic syringe connected to an elongate, metal, single use pipette, portions of which are inserted into the cow's reproductive organs.

The single use AI instrument of the present invention is about 18 inches long, with an od of about 0.134 inches (3.4 mm) which is much easier to pass through the cervix of a heifer than the prior art metal and plastic AI instrument. The elongate metal device of the present invention is hollow and there is no plunger like the conventional prior art AI instrument. The AI device of the present invention does not require a plastic sheath, like the prior art.

The prior art metal and plastic AI device in FIG. 1 is used with a plastic sheath to keep the device sterile. Therefore, this conventional metal AI device can be used over and over by continually replacing the sheath for each cow. The prior art metal and plastic AI device does not use diluent; it only injects semen. The prior art metal and plastic AI device uses a disposable plastic sheath and therefore the metal part of the apparatus can be used over and over with different cows. In other words, the disposable plastic sheath keeps the metal part of the apparatus clean and able to be reused. In stark contrast, the metal pipette in the AI device of the present invention is contaminated on the outside by direct contact with the cow's reproductive tract and on the inside by the reduced sperm count semen. Therefore, the metal pipette of the present invention is contaminated after a single use and cannot be reused like a prior art metal and plastic AI device.

Some bovine AI Technicians will sometimes try to inseminate several females with a single conventional semen straw, especially to save money. In the U.S. dairy industry especially, Bovine AI Technicians will sometimes try to inject only a portion of a conventional straw in a female. This technique is thought to result in lower conception rates than the conventional rates discussed herein. This prior art technique warms one conventional straw at a time. The portions of the semen not used in the first female must be used in a second female within about 20 minutes after thaw.

U.S. Pat. No. 5,147,299 to Mendoza uses an illuminated vaginal speculum to insert an AI device. The second Mendoza patent, (U.S. Pat. No. 6,071,231) explains that the techniques taught in the first patent produce low conception rates. The teachings of the second Mendoza patent were apparently designed to increase conception rates over the teachings in the first Mendoza patent.

U.S. Pat. No. 6,071,231 to Mendoza is entitled "Device and Method for Artificial Insemination of Bovines and other Animals" ('231 Patent). This device is best seen in FIG. 6 of the '231 Patent drawings. The '231 Patent requires two syringes, and a balloon catheter. An illuminated vaginal speculum is used to allow visual insertion into the cow's reproductive organs; rather than rectal palpation. The present invention does not require an illuminated vaginal speculum for insertion into the cow. Instead, the AI apparatus of the present invention is inserted using rectal palpation.

In simple terms, the apparatus in the '231 Patent is inserted by sight, thus the need for an illuminated speculum, whereas the present invention is inserted by "feel". The first Mendoza syringe is used to inflate and deflate the balloon catheter. The second Mendoza syringe is used to inject a diluent for the purpose of pushing semen into the cow, as best seen in FIG. 3 herein. The present invention uses one syringe instead of two because the present invention does not need a balloon catheter. Because of this construction, the present invention is sometimes referred to "catheter free". The '231 Patent teaches use of a diluent such as 2.9% sodium citrate solution. The '231 Patent recommends optimum amounts of semen and diluent for various sized animals; but the patent is silent on the volume of diluent for any animal. Because the '231 Patent is so cumbersome and requires the use of two syringes and a balloon catheter, it is not in wide use. The present invention has a more elegant arrangement, with a single disposable non-toxic syringe connected to an elongate, metal, single use pipette.

U.S. pending patent applications Ser. Nos. 11/829240 and 12/506,723 to Stroud disclose a disposable syringe connected to an elongate plastic pipette. The plastic pipette must be rigid enough to allow a Technician to guide it through the three rings of the cervix, which requires a skilled Bovine AI Technician, especially in the case of a heifer. Without enough stiffness in the plastic pipette, the Technician a) may lose his/her ability to properly guide the pipette and potentially injures a valuable animal, b) can also result in incorrect placement of the semen in the reproductive tract and/or c) may also lose the ability to pass the pipette through the cervix. Production of an elongate plastic pipette as imagined in Stroud '723 has been problematic. Therefore, the present invention discloses a single use, metallic, elongate pipette which does have sufficient stiffness to allow a Technician to properly guide the device through the three rings of the cervix. Unlike Stroud '240 and '723, which imagined development of a disposable plastic pipette, the present invention uses a metal pipette to help guide the device through the cow's reproductive organs without injury to the cow or unnecessary delay in the procedure. Stroud '240 and '723 also failed to recognize that some syringes are toxic to sperm and further, that some storage conditions could enhance or create toxicity in a syringe. The present invention uses non-toxic syringes.

The present invention has several advantages as follows: First, the present invention uses a disposable, non-toxic syringe, unlike any of the prior art. Second, the present invention has a small od, unlike any of the prior art which makes it easier to insert into heifers. Third, the present invention uses semen with a reduced sperm count, unlike some of the prior art. Fourth, the present invention uses a stiff metal pipette which facilitates insertion, unlike Stroud which imagined a plastic pipette and unlike the conventional prior art AI instrument which uses a metal and plastic pipette.

SUMMARY OF THE INVENTION

In some embodiments, the procedure or method disclosed in the present invention may require: a) semen with a reduced sperm count, b) a single, removable, disposable non-toxic syringe, c) a single use, hollow, elongate metal pipette, and d) a diluent.

Bovine AI Technicians are considered to be persons skilled in the art for purposes of this invention. Bovine AI Technicians typically are skilled individuals because it takes a deft touch to practice rectal palpation insertion techniques, especially with heifers. It also takes a strong constitution to repeatedly insert your arm into a cow's rectum day in and day out. The present invention may be used with or without super-ovulation.

A. Reduced Sperm Count Semen.

Semen with a reduced sperm count can be obtained in at least four different ways. One way is for the Bull Stud to fill each unsorted semen straw with a reduced quantity of sperm. A second way is for the dairymen and/or Bovine AI Technician to use the "snip technique" discussed herein. A third way to obtain reduced sperm count semen is from producers of sex sorted semen. A fourth way is for a Bovine AI Technician to thaw a single straw of semen, mix with diluent, and inseminate two or more females.

According to the teaching of one embodiment of this invention, use of reduced sperm count semen from a Bull Stud, may produce comparable conception rates when compared with conventional techniques using unsorted semen straws with about 20 million sperm each. Freezing and thawing reduces sperm motility in bovine semen. For purposes of this application, sperm count is discussed before freezing. Sales of reduced sperm count semen may be good for the Bull Stud because they can sell a larger number of higher priced semen straws, which produces more revenue, which can be invested in their bull breeding program to improve the gene pool.

Semen is sex sorted for use in the case of dairy cattle to produce more female offspring than males, because the females are much more valuable for milk production. Presently, most sex sorted semen straws have about 2.1 million sperm. Sex sorted semen straws with a reduced sperm count may also be beneficial to producers because decreased costs and increased revenues. Sex sorted semen straws are presently packaged in ¼ cc straws and are used in the U.S and around the world.

B. Reduced Toxicity

Research has shown that the elastomeric plunger and/or lubricant in some syringes are toxic to bovine sperm. Storage of some syringes under adverse conditions may create or enhance toxicity. Non-toxic syringes are disclosed herein and proper storage conditions are suggested. The term "non-toxic syringe" as used herein means that the syringe is not toxic to bovine sperm.

C. Diluent

Any type of diluent may be used in the practice of the present invention, provided it is not hostile to bovine sperm. The volume of diluent used in the present invention is left to the discretion of the Bovine AI Technician.

D. The AI Apparatus

In some embodiments of the present invention, od of the AI instrument is approximately 0.134 inches (3.4 mm) and the od of the prior art metal and plastic AI instrument, shown in FIG. 1, is approximately 0.165 inches (4.2 mm). This means that the od of the AI instrument of the present invention is approximately 0.031 inches (0.8 mm) less than the prior art metal and plastic AI instrument in FIG. 1. Although this may not sound like much of a difference, it makes a huge difference when heifers are being artificially inseminated. Because heifers have never given birth, they have a very, very tight cervix. The thin and rigid metal pipette of the present invention makes it easier to AI heifers with semen having a reduced sperm count.

E. Ovulation Examination Prior to AI

Bovines have two uterine horns with an ovary located proximate each horn. Typically, only one of these ovaries will produce an egg per heat cycle. Identification of the ovary that will produce the egg may be determined as follows: a) by an ultrasound examination of both ovaries conducted prior to AI or b) by an examination using rectal palpation of both ovaries prior to AI. These "Ovulation Examinations" may be optionally conducted on some embodiments of this invention prior to insemination. In one embodiment, the ovulation examination is required.

F. Definitions

The term "cow" as used herein, means a female bovine that has previously produced a calf The term "heifer" and "virgin heifer" as used herein, refers to a female bovine that has never produced a calf. A first calf heifer refers to a bovine that has given birth to its first calf The term "female" as used herein includes both cows, first calf heifers and heifers.

The terms "semen with a reduced sperm count," "reduced sperm count semen" and/or words to that effect means a) semen from conventional straws produced by a Bull Stud with less than approximately 20 million non-sorted sperm, b) semen from conventional semen straws with approximately 20 million non-sorted sperm that are cut in several pieces to effectively reduce the number of sperm that are being used in each AI procedure c) sex sorted semen with a sperm count that is less than the amount contained in conventional packaging of sorted semen and d) sex sorted or unsorted semen from a single semen straw which is used to inseminate multiple females, thus effectively reducing the sperm count in the insemination solution delivered to each female.

The terms "conventional sperm count", "conventional sperm count semen" and/or words to that effect means: a) semen from conventional straws produced by a Bull Stud with about 20 million non-sorted sperm and/or b) sex sorted semen in conventional packaging.

The phrase "sex sorted semen in conventional packages", "conventional packaging of sorted semen" and/or words to that effect means: a) approximately 2.1 million sorted sperm per straw intended for heifers with a 90% female offspring expectation, b) approximately 5 million sorted sperm in a straw intended for use in a super ovulated female with a 90% female offspring expectation and c) other sorted semen straws sold in commercial quantities with a reduced sperm count from that of non-sorted semen.

The term "conventional conception rates" or words to that effect, as used herein means a) using non-sorted semen, about 20% to about 40% in dairy cows, b) using non-sorted semen, about 50% to about 70% in beef cows and dairy heifers, c) using sex sorted semen, about 10% to about 30% in dairy cows, d) using sex sorted semen, about 30% to about 40% in beef cows, e) using sex sorted semen, about 40% to about 50% in dairy heifers, and f) using sex sorted semen about 40% to about 50% in beef heifers.

The luer lock system of joining needles and/or tubing to syringes has been in use for generations. See the website of Qosina Corporation of Edgewood, N.Y. (www.qosina.com) As shown in FIG. 5, luer connectors include the traditional luer hub, the luer lock on the syringe and all sorts of other designs as shown in the above website including, connectors with barbs, threaded connectors, tapered connectors and others. The term "luer connector" as used herein means all types of luer connectors included but not limited to a luer hub, a luer lock, threaded luer connectors, oiling luer hubs, barbed luer hubs, etc.

DETAILED DESCRIPTION OF THE INVENTION

Figure 1:
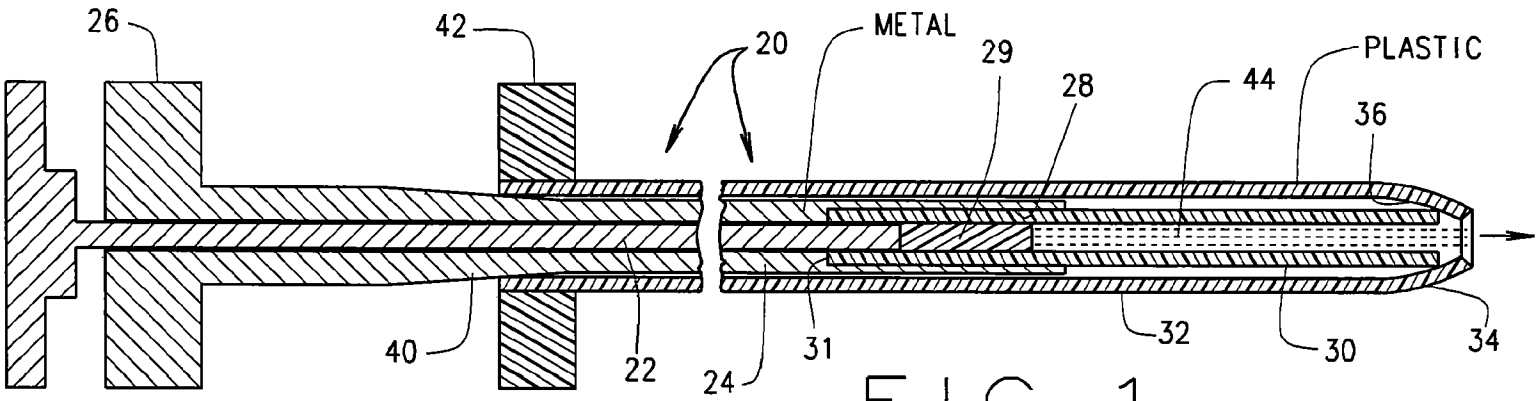
FIG. 1 PRIOR ART
FIG. 1 is a section view of a prior art AI apparatus with a metal plunger and a plastic sheath to inject semen into the cow. This device is in widespread use in the U.S and internationally. It is inserted into the cow using rectal palpation of the uterus.

FIG. 1 is a section view of a prior art metal and plastic AI apparatus 20 that is in common use by most Bovine AI Technicians in the U.S. This apparatus is inserted into the cow using rectal palpation techniques, well known to those skilled in the art.

A metal plunger 22 slides to and fro inside the elongate metal barrel 24 of this AI apparatus. For the convenience of the AI Technician, finger tabs 26 are formed on the proximal end of the metal barrel to make it easier to operate the metal plunger. A receptacle 28 is formed in the distal end of the metal barrel and is sized to receive either a ½ cc semen straw and/or a ¼ cc semen straw. Sex sorted semen is loaded into ¼ cc semen straws on a worldwide basis. Outside the U.S, unsorted semen is also loaded into ¼ cc straws. In the U.S., unsorted semen is loaded into ½ cc semen straws.

In this figure, a ½ cc semen straw 30 is inserted into the receptacle of the metal barrel to a metal shoulder 31 where the semen straw stops. The semen straw 30 has a cotton plug 29 on one end. This is the end that is inserted into the AI instrument and is contact with the metal plunger 22. When the Bovine AI Technician pushes on the plunger 22, most of the semen 44 is ejected from the AI instrument 20, but the cotton plug is not because it is captured by the plastic sheath 36, as is well known to those skilled in the art. An elongate disposable plastic sheath 32 has a proximal and distal end. This sheath 32 fits over the elongate metal barrel 24 and the semen straw 30. The disposable plastic sheath has a tapered tip 34 formed on the distal end to facilitate insertion into the cow's reproductive organs. The interior wall of the plastic sheath 36 seals the distal end of the plastic semen straw 30 to prevent semen from leaking back into the AI instrument 20. The proximal end of the elongate disposable plastic sheath is split in half, not shown, for about an inch or so to facilitate fitting over an enlarged taper 40 formed on an outside surface of the elongate metal barrel proximate the finger tabs. A donut shaped slide 42 fits over the elongate disposable plastic sheath to mechanically grip the sheath against the taper on the outside surface of the elongate metal barrel. The purpose of the donut shaped slide is to keep the elongate disposable plastic sheath in place on the metal barrel during insertion and withdrawal from the cow's reproductive organs.

Some prior art metal and plastic AI instruments are specifically designed to hold a ¼ cc straw; others are specifically designed to hold a ½ cc straw.

Figure 2:
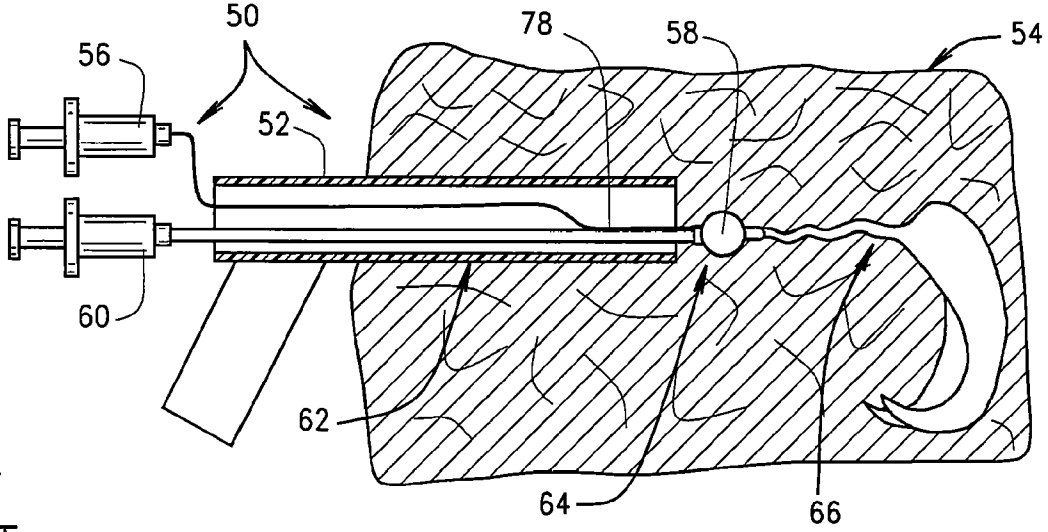
FIG. 2 PRIOR ART
FIG. 2 is a cut-a-way view of a prior art apparatus disclosed in U.S. Pat. No. 6,071,231 to Mendoza. This device uses an illuminated speculum to visually insert the apparatus in a cow. This apparatus uses two syringes, the first to inflate and deflate a balloon catheter and a second syringe to inject diluent and semen into the cow.

FIG. 2 is a cut-a-way view of a prior art apparatus 50 disclosed in U.S. Pat. No. 6,071,231 to Mendoza. As previously mentioned, this device uses an illuminated speculum 52 to visually insert the apparatus in a cow 54. This apparatus uses two syringes. The first syringe 56 is used to inflate and deflate a balloon catheter 58 and a second syringe 60 is used to inject diluent and semen into the cow. The Bovine AI Technician uses the lighted speculum 52 to open the animal's vagina 62 and view the interior. The apparatus 50 is pressed part way into the cervix 64, and the balloon catheter 58 is inflated to form a seal with the cervix. The dilution fluid is forced out of the second syringe 60, hopefully pushing the semen sample and diluent into the uterus 66.

Figure 3:
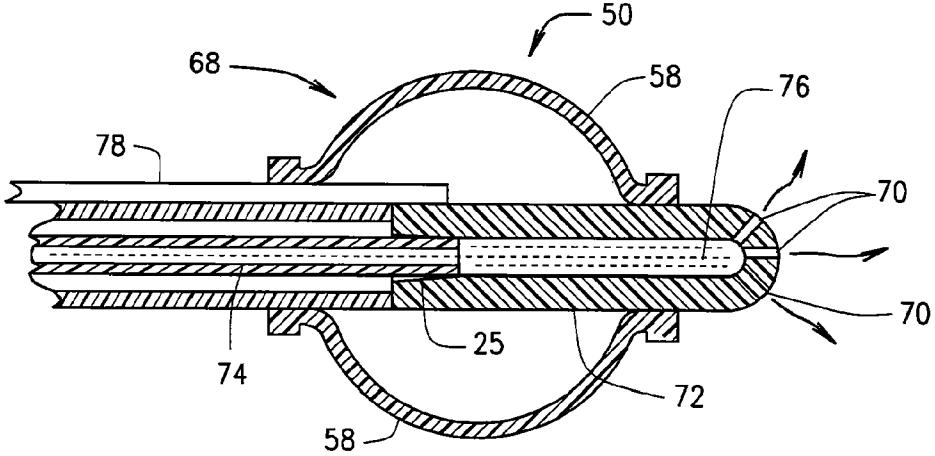
FIG. 3 PRIOR ART
FIG. 3 is a section view of the distal end of the prior art Mendoza device of FIG. 2 with the balloon catheter inflated. This is a reproduction of a figure from U.S. Pat. No. 6,071,231.

FIG. 3 is an enlarged section view of the distal end 68 of the prior art Mendoza apparatus 50 of FIG. 2 with the balloon catheter 58 shown in the inflated position. FIGS. 2 and 3 are reproductions of figures from U.S. Pat. No. 6,071,231. FIG. 3 shows the ejection of semen and diluent from ejection ports or orifices 70 in tip 72. Multiple ejection ports 72 are positioned at the apex and on lateral sides of tip 72. Although one port may be sufficient, multiple ports are preferable. The tip 72 may be configured as shown in U.S. Pat. No. 5,147,299. As syringe 60, shown in the preceding figure is pushed, diluent fluid is pushed forward into semen straw 74 thereby pushing semen 76 out of the tip 72 where it is ejected into the uterus 66 of the cow, as best seen in the prior figure. As the second syringe 60, shown in the proceeding figure is pushed all the way down, all the semen and most of the diluent fluid will be ejected. In order to deliver the optimum amount of diluent, the amount of diluent initially placed in the second syringe should therefore be greater than the desired amount by the amount that will fill the artificial insemination device 50. A tube 78 connects the first syringe 56, shown in the proceeding figure, to the balloon catheter 58. The first syringe 56 is used to inflate and deflate the balloon catheter 58.

Figure 4:
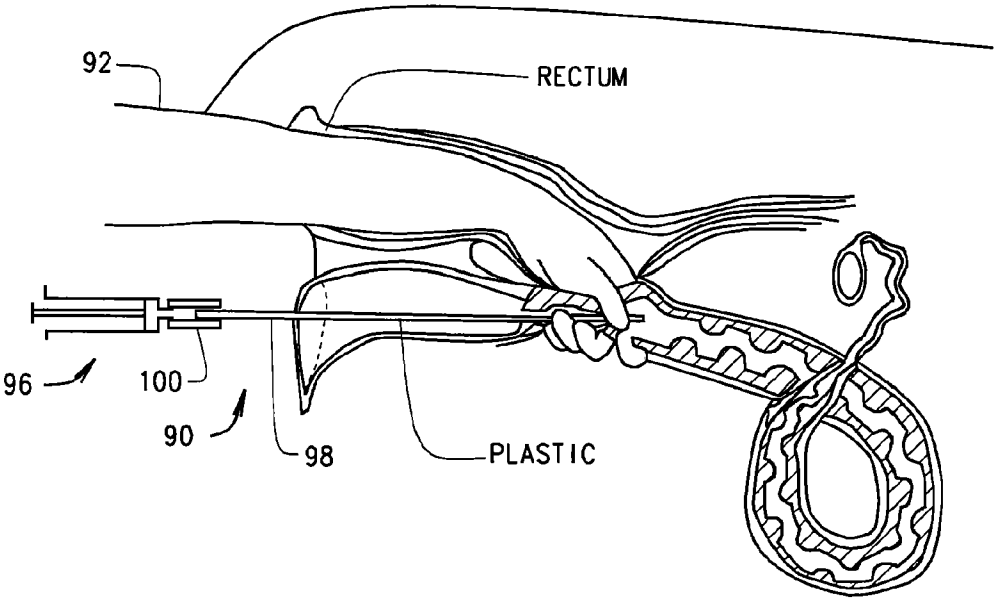
FIG. 4 PRIOR ART
FIG. 4 is a section view of a prior art apparatus disclosed in U.S. patent application Ser. No. 12/506,723 to Stroud. This device is inserted into the cow using rectal palpation of the uterus. This prior art apparatus uses a single syringe to inject diluent and semen into a cow, the semen coming from a semen straw having a conventional sperm count.

FIG. 4 is a section view of a prior art apparatus 90 disclosed in U.S. patent application Ser. No. 12/506,723 to Stroud. This device is inserted into the bovine using rectal palpation of the uterus which is the standard technique used in the U.S. for AI of all bovines. The Bovine AI Technician's hand 92 is inserted into to the rectum of the cow, as shown. This rectal palpation technique is well known to those skilled in the art. This apparatus uses one syringe 96 to inject diluent and semen into a bovine, the semen coming from a semen straw having a conventional sperm count. A conventional syringe 96 with an elastomeric plunger is in fluid communication with PLASTIC pipette 98. The syringe is connected to the plastic pipette by a connector 100

Figure 5:
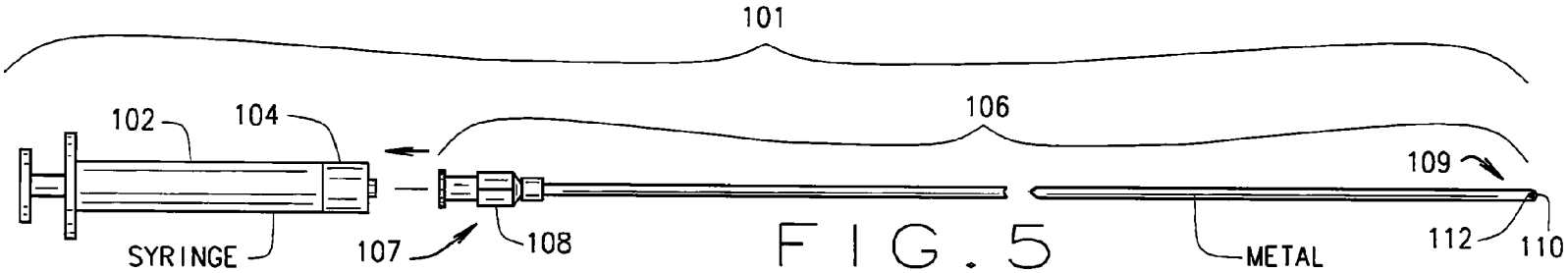
FIG. 5 is a perspective view of the present invention. This device is inserted into the female using rectal palpation techniques. In this figure the disposable, non-toxic syringe is not connected to the hollow, elongate, metal pipette.

FIG. 5 is a perspective view the AI instrument of the present invention generally identified by the numeral 101. The instrument 101 is inserted into the bovine using rectal palpation techniques well known to those skilled in the art. In this figure, the disposable, non-toxic syringe 102 is disconnected from the hollow, elongate, metal pipette 106. The syringe has a luer lock 104 is formed on the distal end, or some other form of luer connector. The hollow, elongate metal pipette has a proximal end 107 which may be formed into a luer hub 108 or some other type of luer connector. The distal end of the pipette 109 may be formed into a generally rounded tip 110. At least one outlet port 112 is formed proximal the tip 110. The luer lock 104 and the luer hub 108 may be disconnected as shown in this figure or connected as shown in the next figure.

Figure 6:
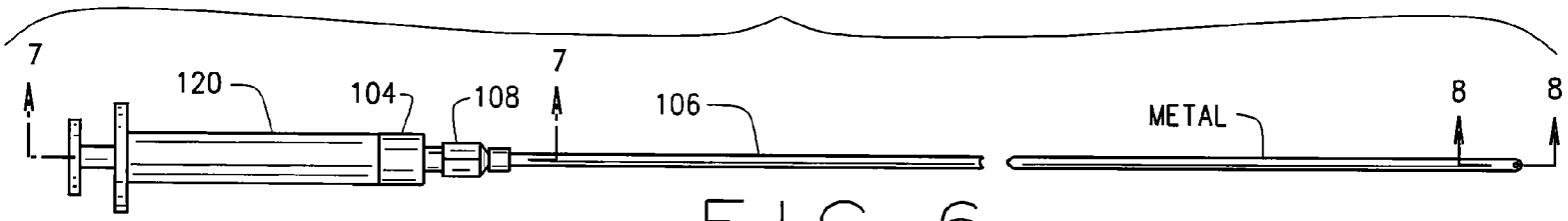
FIG. 6 is a perspective view of FIG. 5 wherein the non-toxic syringe has been connected to the hollow, elongate, metal pipette

FIG. 6 is a perspective view of FIG. 5 wherein the disposable, non-toxic syringe 102 is connected to the hollow, elongate, metal pipette 106. The luer hub 108 or some other type of luer connector on the pipette 106 is inserted into the luer lock 104 or some other type of mating luer connector on the syringe 102 and these components are gently rotated in opposite directions until they lock together and form a seal. The design and shape of the luer hub and the luer lock are known.

Figure 7:
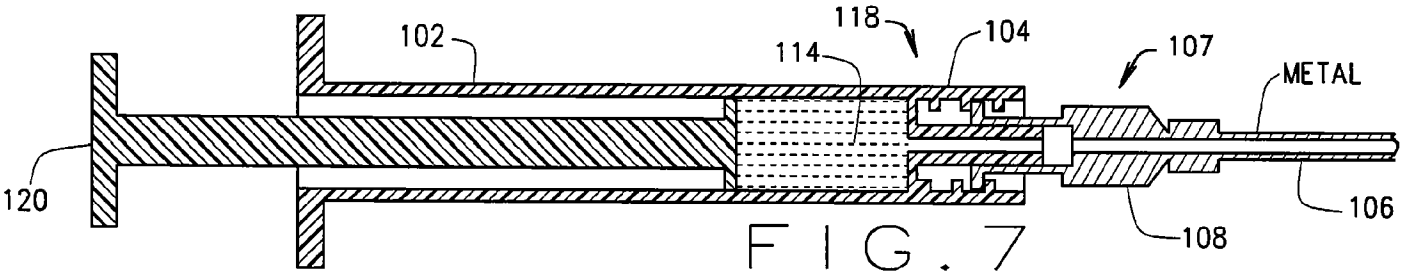
FIG. 7 is an enlarged cross-section drawing along the line 7-7 of FIG. 6 showing the disposable, non-toxic syringe of the present invention connected to the proximal end of the hollow, elongate, metal pipette.
Figure 8:
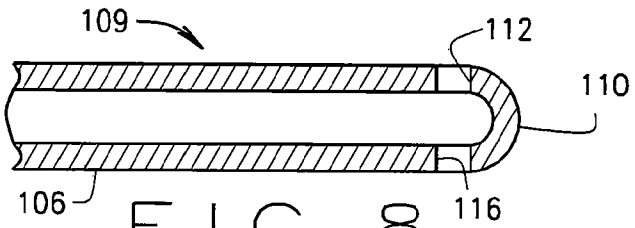
FIG. 8 is an enlarged cross-section drawing along the line 8-8 of FIG. 6 showing the distal end of the hollow, elongate, metal pipette.

FIG. 7 is a cross-section drawing along the line 7-7 of FIG. 6 of the disposable, non-toxic syringe 102 of the present invention connected to the proximal end 107 of the hollow, elongate, metal pipette 106. In this figure, diluent and semen have been aspirated into the disposable, non-toxic syringe, forming an insemination solution 114. When the syringe plunger 120 is pushed by the Bovine AI Technician, the insemination fluid flows from the syringe, through the hollow, elongate metal pipette and out the at least one outlet port into the bovine FIG. 8 is a cross-section enlargement along the line 8-8 of FIG. 6 of the distal end 109 of the hollow, elongate metal pipette 106. In this embodiment, the tip 110 is rounded and has two transverse outlet ports, 112 and 116, respectively. These outlet ports allow an insemination solution to flow from the syringe, through the hollow, elongate metal pipette 106, out the two opposing transverse outlet ports and into the bovine.

Referring now to FIGS. 5, 6, 7 and 8, the luer hub 108 or some other type of luer connector, on the pipette 106 and the luer lock 104 or some other type of mating luer connector on the syringe 102 are a means to achieve a fluid tight connection between the distal end 118 of the single, disposable non-toxic syringe 102 and the proximal end 107 of the hollow, elongate metal pipette 106 to allow the insemination solution 114 in the syringe 102 to flow from the single, disposable non-toxic syringe 106 through the hollow, elongate metal pipette 106 and out the at least one outlet port 112 into the female's uterus.

Figure 9:
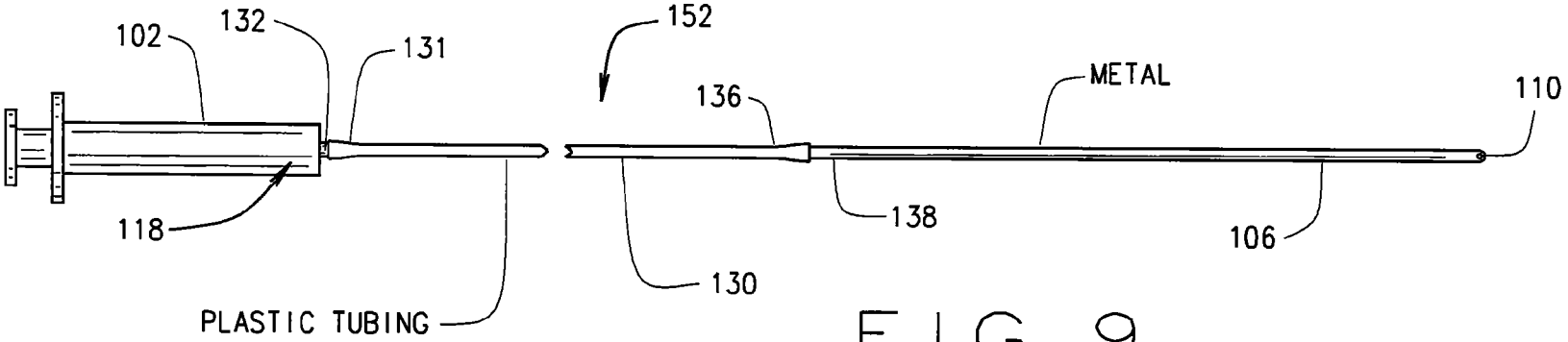
FIG. 9 is a perspective view of an alternative embodiment of the hollow, elongate, metal pipette connected to the disposable, non-toxic syringe by flexible tubing.

FIG. 9 is a perspective view of an alternative embodiment 152 of the hollow, elongate, metal pipette 106 connected to the disposable, non-toxic syringe 102 by flexible tubing 130. The tubing may be formed from any number of elastomers, provided that they are non-toxic to bovine sperm. In this embodiment, a luer slip 132 or some other type of luer connector is formed on the distal end 118 of the disposable, non-toxic syringe 102. The proximal end 131 of the tubing 130 is sized and arranged to fit over and seal against the luer slip 132, as shown. The distal end 136 of the tubing is sized and arranged to fit over and seal against the proximal end 138 of the pipette 106. The proximal end 138 of the pipette does not have a luer hub. Rather, it is a hollow tube of generally constant diameter from the proximal end 138 to the tip 110. The insemination solution flows from the disposable non-toxic syringe, through the non-toxic tubing, through the metal pipette and out the at least one outlet port.

The luer slip 132 or some other type of luer connector on the syringe 102, the proximal end 131 of the flexible tubing 130, the distal end 136 of the flexible tubing 130 and the proximal end 138 of the pipette 106 are a means to achieve a fluid tight connection between the distal end of the single, disposable non-toxic syringe 102 and the proximal end 138 of the hollow, elongate metal pipette 106 to allow the insemination solution 114 in the syringe 102 to flow from the single, disposable non-toxic syringe 102 through the hollow, elongate metal pipette 106 and out the at least one outlet port 112 into the female's uterus.

Figure 10:
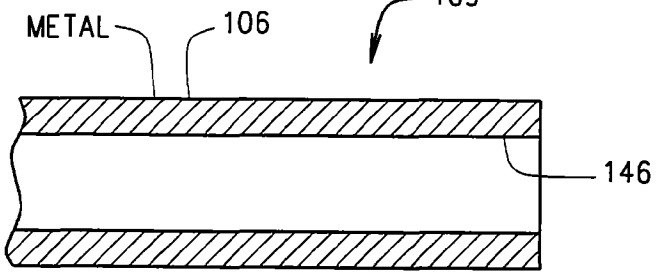
FIG. 10 is a sectional view of an alternative embodiment of the distal end of the hollow, elongate, metal pipette.

FIG. 10 is an enlarged section view of an alternative embodiment of the distal end 109 of the hollow, elongate, metal pipette 106. In this embodiment, the distal end 109 of the pipette 106 is formed into an open bore 146. This alternative embodiment is not preferred, as it may entrap debris while passing through the bovine vagina and for other reasons.

Figure 11:
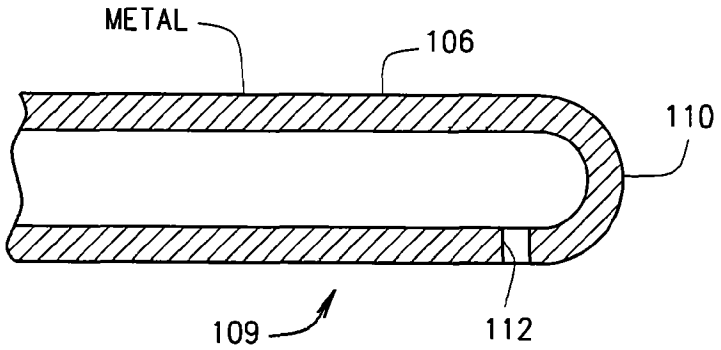
FIG. 11 is another alternative embodiment of the distal end of the hollow, elongate, metal pipette.

FIG. 11 is another alternative embodiment of the distal end 109 of the hollow, elongate, metal pipette 106. In this embodiment, the tip 110 is formed into a smooth rounded shape to facilitate easy passage through the bovine. At least one transverse outlet port 112 is formed proximate to the tip 110.

Figure 12:
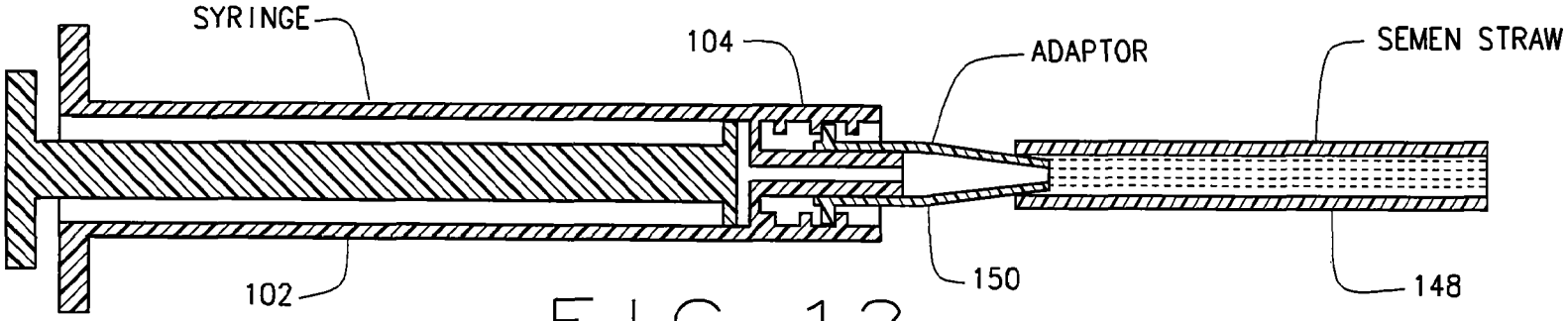
FIG. 12 is a cross-section of an adapter and ½ cc semen straw connected to the disposable, non-toxic syringe used to aspirate the semen from the semen straw.

FIG. 12 is a cross-section of an adapter 150 and ¼ cc semen straw 148 connected to the disposable, non-toxic syringe 102. The purpose of the adapter is to facilitate aspiration of the semen from the semen straw 148 into the disposable, non-toxic syringe 102. The disposable, non-toxic syringe, the adapter and the elongate hollow, metal pipette may be packaged and sold as a kit to Bovine AI Technicians, dairies and others. The present invention, in various embodiments may be packaged in a kit. For example, the components of the apparatus in FIG. 9 may be sold as a kit. In another example, the components shown in FIG. 6 may be sold as a kit. Arrangements of various components from various embodiments may be sold as a kit.

The present invention may be practiced in at least five different ways. Some, but not all of the embodiments disclosed herein include as an option an ovulation examination prior to insemination. Using ultrasound technology the ovulating ovary can be identified prior to insemination. After the ultrasound, using the present invention, the insemination solution may be pumped from the syringe through the hollow, elongate, metal pipette into only one uterine horn, e.g. the horn that will act as a conduit for sperm to fertilize the egg. If this ultrasound procedure is used, the tip of the hollow, elongate, metal pipette must be inserted past the body of the uterus and into the appropriate uterine horn that acts as a conduit to transport sperm to the ovulated egg, thereby concentrating most of the sperm into the ovulating horn. Instead of an ultrasound examination, the vet or other technician may manually palpate the ovaries to determine which will ovulate. After this manual ovulation examination, most of the diluent and sperm are injected into the horn that acts as a conduit to transport sperm to the ovulated egg achieving at least conventional conception rates. (Both the ultrasound evaluation and the manual palpation to determine ovulation are sometimes referred to herein as an "Ovulation Examination"). The first way to practice the present invention is for the Bull Stud to harvest semen from a desirable bull as described below.

A. The Bull Stud

The Bull Stud reduces the sperm count in each straw to less than 20 million sperm. For example, each reduced sperm count semen straw could have approximately 15 million sperm or less. These reduced sperm count semen straws are then frozen in a conventional manner; well know to those skilled in the art. These reduced sperm count semen straws are sold by the Bull Studs to dairy farms and others.

At a large dairy, a hundred female bovines or more may be artificially inseminated on a given day by a trained Bovine AI Technician. "Room Temperature" for this procedure or method is defined as between about 68° to about 80° F. and optimally about 74° F. In a facility that is at Room Temperature, the Technician lays out at least one multi-dose bag of diluent, some disposable non-toxic syringes and some hollow, elongate metal pipettes.

1. Non-Toxic Disposable Syringes

The inventors initially thought that any syringe would be suitable for use in this invention. However, experimental testing proved otherwise. Some syringes are produced with elastomers and/or lubricants that are harmful to sperm. Some syringes that are not harmful to sperm as originally produced may become harmful by being stored in a hot warehouse above about 95° F. Applicant has determined that syringes that are toxic to sperm are not suitable for use in this invention with reduced sperm count semen straws. Applicant recommends use of Norm-Ject® disposable syringes available from Air-Tite Products Co., Inc. located in Virginia Beach, Va., if and only if they have not been stored in a hot warehouse. Applicant recommends using current year production syringes that are as fresh as possible from this manufacturer. Other non-toxic syringes may be purchased from Henke, Sass, Wolf of America, Inc. (www.hswoa.com) in Dudley, Mass. a subsidiary of Henke, Sass, Wolf, GmbH of Tuttlingen, Germany (www.henkesasswolf.de). Specifically the HSW Norm-Ject® disposable syringe may also be suitable for use in the practice of this invention, if and only if they have not been stored in a hot warehouse. (Other syringes, unknown to applicant, may also be suitable for use in this invention, provided that they are non-toxic to bovine sperm.)

Air-Tite represents on its website (www.air-tite-shop-.com) that the Norm-Ject disposable syringe is latex free, contains no rubber, no silicone oil, styrene or DEHP and are DNA free. The website further states: "These syringes are the choice for any situation needing an inert, non-reactive syringe. Because of their composition these Norm-Ject® disposable syringes are indicated for nuclear medicine, amniocentisis, IVF, embryo-transfer, chromatography and many laboratory procedures. They are more chemically resistant than rubber tipped syringes and are manufactured only from laboratory grade polypropylene and polyethylene." It is important to note that bovine artificial insemination is not one of the uses mentioned by the manufacturer, as of Aug. 9, 2010, in this website description of its product. The term "non-toxic syringe" as used herein means a disposable Norm-Ject® disposable syringe, a HSW Norm-Ject® disposable syringe and or any other syringe that is latex free, contains no rubber, no silicone oil, styrene, DEHP and is DNA free.

The term "single, disposable, non-toxic syringe" means any of the non-toxic syringes discussed above that a) contain a dose of insemination solution for a single bovine, and/or b) a larger non-toxic syringe that contains multiple does of insemination solution for multiple cows. An automatic syringe, including, draw off syringes and/or self filling syringes such as those from Allflex USA, Inc. located at the DFW Airport in Texas (see www.allflexusa.com) may be used but are not recommend because of contamination concerns. A repeating syringe, such as those also available from Allflex mentioned above, may be used, but is not recommended because of contamination concerns.

2. Diluent

The Bovine AI Technician may select any of several know diluents for use in this procedure including: buffered saline, various commercially available embryo flush solutions, various commercially available extenders used in cryopreversation of semen and other products or other solutions not identified herein may also prove useful provided they have a proper pH, osmolarity and are properly buffered to dilute and support the life of the sperm. The pH of the diluent is typically about 7 to about 7.4 and the osmolarity is typically about 280 to about 300 mOsm/L.

Various commercially available embryo flush solutions that may be suitable in the practice of this invention including:

a) Syngro Holding Medium, Vigro Complete Flush Solution, Vigro Holding Plus, Vigro Rinsing Solution all available from Bioniche Animal Health of Belleville, Ontario, Canada, (www.bionicheanimalhealtyh.com).

b) emP3 Complete Flush and emP3 Holding Solution both available from Partnar Animal Health of Port Huron, Mich., (www.partnaranimalhealth.com).

c) Emcare Complete Ultra Flush Medium, available from ICPbio International Ltd. Of Auckland, New Zealand, (www.icpbio.com). Some extenders used in cryopreservation of bull semen may be used as a diluent in the practice of this invention and others may not. The term semen extender and semen diluent are sometimes used interchangeably in the industry.

Triladyl, an extender used in cryopreservation of bull semen is not a suitable diluent for use in the practice of this invention because it also contains the cryoprotectant glycerol which is toxic at some concentrations to sperm at temperatures that support cell function. The semen extender disclosed in U.S. Pat. No. 6,368,786 (assigned to IMV Technologies) also contains glycerol which means that it is likewise not suitable for use in this invention. Other semen extenders such as Biladyl®, Fraction A, also from Minitube of America in Verona, Wis. (www.minitube.com) does not contain a cryoprotectant or glycerol and may be suitable for use in the practice of this invention. The present invention may be practiced with any diluent that is not toxic to bovine sperm or the cow's reproductive system.

The diluent may be contained in disposable plastic bags such as those found in hospitals holding Ringer's solution, etc. The reduced sperm count semen straws are kept frozen under liquid nitrogen in a Dewar flask until ready to use. (Bull Studs in the U.S. use ½ cc semen straws that are crimped on one end with a cotton plug on the other end. The semen is in between the crimped end and the cotton plug on the other end.)

It is best to wait until the diluent reaches Room Temperature before proceeding. In the alternative, the Bovine AI Technician may keep the bags of diluent in a storage device which holds the diluent at Room Temperature, to expedite the process. Once the diluent has reached Room Temperature, the Technician fills one of the disposable syringes with the diluent. In the U.S., an adapter is then connected to the luer hub on the syringe. The Technician warms a reduced sperm count frozen straw of semen in warm water at a temperature of about 95° to about 98° F. for at least about 15 seconds. Once the semen is thawed, the crimped tip of the reduced sperm count semen straw is cut with a pair of scissors and the cut end is placed over the adapter. The syringe, adapter and reduced sperm count semen straw are held vertically with the cotton plug farthest away from the earth. Then the cotton plug is cut off the straw, which allows the semen to drain by gravity into the diluent in the syringe or in the alternative the semen may be aspirated from the semen straw into the diluent in the syringe. The adapter and the used semen straw are removed from the syringe.

An elongate, metal, single use pipette is connected to the luer hub on the syringe. Applicant recommends that that the elongate, metal, single use pipette be sterile, but this is not essential to the practice of the invention. The distal end of the pipette is inserted by the Technician into the cow's vagina, past the three rings of the cervix to the body of the uterus, using rectal palpation. The Bovine AI Technician then pushes the plunger of the disposable syringe which pumps the diluent and the semen out of the syringe, through the single use elongate metal pipette and into the body of the uterus. The syringe is disposed of and the single use metal pipette may be destroyed or it may be sterilized and reused, provided it is kept in a sterile condition until the next use. If the price of the metal pipette is low enough, it is likely that the metal pipettes will be discarded for recycling.

The bovine reproductive tract, from posterior to anterior, has a vagina, a cervix, a uterine body, two uterine horns, two fallopian tubes, and two ovaries. During a prior art AI procedure the contents of a single straw containing about 20 million non-sorted sperm is placed through the vagina, through the cervix and into the uterine body, which is in fluid communication with both uterine horns. Approximately half of the sperm are naturally shunted to the left uterine horn and half to the right. Sperm that naturally shunts to the left horn has a chance to fertilize an ovum if it is released from the left ovary. Sperm naturally shunted to the right horn has a chance to fertilize an ovum if it is released from the right ovary. Only one ovary releases an egg during each heat cycle.

B. The Snip Technique

A second way to practice the present invention is using the "snip technique" using a conventional semen straw with a) about 20 million unsorted sperm in each straw or b) with a sex sorted straw. First the Bovine Technician pours a small bath of liquid nitrogen. Next a frozen semen straw is removed from a Dewar flask and is placed in the small bath of liquid nitrogen. While under the nitrogen bath, the Bovine AI Technician cuts off a piece of the frozen straw, thus mechanically reducing the sperm count in the piece that has been cut off from the main body of the straw. The frozen portion that has been cut off is then placed in a sterile test tube filled with diluent, at about 95° F. to about 98° F. The balance of the straw that is still in the small bath of liquid nitrogen is removed and quickly placed back in the Dewar flask. After about 15 to about 30 seconds, the semen has been thawed and released into the insemination solution with the diluent in the test tube. The Bovine AI Technician then aspirates the insemination solution from the test tube into the single, disposable non-toxic syringe, to which additional diluent may be added, at the discretion of the Bovine AI Technician. In the alternative, the Bovine AI Technician can draw a larger aliquot of diluent into the syringe from a multi-dose bag and then aspirate the insemination solution from the test tube, containing the thawed semen with a reduced sperm count. In this fashion, the "snip technique" uses a reduced number of sperm, while at least maintaining comparable conception rates to conventional AI procedures using approximately 20 million sperm per cow in the case of non-sex sorted semen. Again, the type of diluent and the amount of diluent are left to the discretion of the Bovine AI Technician. This embodiment may include as an option an Ovulation Examination prior to insemination, as discussed herein.

C. Sex Sorted Semen

A third way to practice the present invention is with sex sorted semen straws having a reduced sperm count. Semen is sorted by sex, in the case of dairy cattle to produce more female offspring which are much more valuable for milk production. Each sex sorted semen straw contains a fraction of the amount of semen found in a conventional non-sorted semen straw, as previously discussed. As of the filing dated of this application, most sex sorted semen straws have about 2.1 million sperm each. Sex sorted semen straws with a reduced sperm count will have even less sperm than these conventionally packaged straws. Sex sorted semen straws are packaged in ¼ cc straws and are used in the U.S and around the world. Sex sorted semen is available from Sexing Technologies of Navasota, Tex., and some but not all Bull Studs. This embodiment may include as an option, an Ovulation Examination prior to insemination, as discussed herein.

D. Single Straw Dilution

A fourth way to use reduced sperm count semen is for a Bovine AI Technician to thaw a single straw of semen, mix with diluent, and concurrently inseminate two or more females. A single straw of semen is warmed and mixed with diluent to form an insemination solution. This solution is then drawn into the AI instrument of the present invention. Then, two or more females are inseminated with portions of this insemination solution. This "Single Straw Dilution Technique" may be used with unsorted semen and with sorted semen. This embodiment may include as an option an Ovulation Examination prior to insemination, as discussed herein.

E. Ovulation Examination Prior to Insemination with Semen Having a Conventional Sperm Count All of the embodiments previously discussed have used reduced sperm count semen to achieve at least conventional conception rates. This embodiment departs from the foregoing because an ovulation examination is conducted on every female prior to insemination with semen having a conventional sperm count to achieve increased conception rates. This embodiment may be used with sex-sorted semen and non-sorted semen. As of the filing date of this application, most sex sorted semen is packaged in a ¼ cc straw with about 2.1 million sperm per straw. As of the filing date of this application, most unsorted semen in the U.S. is packaged in a ½ cc straw with about 20 million sperm; outside the U.S. unsorted semen is packaged in a ¼ cc straw with about 20 million sperm. These conventional sperm counts are used in this embodiment.

Prior to insemination, the Bovine AI Technician and/or a vet or other qualified person conducts an examination of the female to determine which ovary will produce the egg. This Ovulation Examination of the ovaries could be conducted by ultrasound or the examination could be conducted by manual rectal palpation of the ovaries.

After the ovulation examination, semen with at least a conventional sperm count is contacted with a diluent to form an insemination solution. Again, the type of diluent and the volume are left to the discretion of the Bovine AI Technician. The insemination solution is positioned in a single, disposable, non-toxic syringe. Fluid communication is established between the single, disposable, non-toxic syringe and a hollow, elongate, metal pipette as shown in FIG. 6 or FIG. 9 or by some other means. The hollow, elongate, metal pipette is guided using rectal palpation techniques through the female's vagina, cervix, and uterus and into the uterine horn that will act as a conduit to transport sperm to fertilize the egg, as previously determined by the ovulation examination. Proper placement of the pipette in the correct uterine horn is accomplished without an illuminated speculum or a balloon catheter. Use of this procedure should result in increased conception rates when compared with conventional conception rates, discussed herein. To further improve the chances of fertilization, this technique may be used with two semen straws having a conventional sperm count. This two straw approach may be beneficial for some cows.

As of the filing date of this patent application, sex sorted semen is only recommended for use in dairy and beef heifers. Dairy cows are difficult to get pregnant with a non-sorted straw containing 20 million sperm; therefore, use of 2.1 million sorted sperm is problematic. For this reason, producers of sex sorted semen currently do not recommend use of sorted semen in dairy cows.

Conducting an ovulation examination of dairy and beef cows, prior to insemination should allow sex sorted semen to be used successfully on a wide commercial basis for the first time in history, provided that substantially all of the diluent and sorted semen is delivered to the uterine horn that will act as a conduit to transport sperm to fertilize the egg, using the teachings of this invention. Use of sex sorted semen in dairy cows is an important breakthrough because here are many, many more cows in the dairy and beef herds than heifers. This breakthrough effectively allows producers of sex sorted semen into a huge new market which could allow revenues to skyrocket. (Sex sorted semen is typically used on a limited commercial basis because it is used primarily on dairy and beef heifers which are a small part of the larger herd.)

What is claimed is:

1. A [catheter free, speculum free, non-surgical] method for artificial insemination[of a female bovine using reduced sperm count semen and a diluent, the method], comprising[the following steps]:

[(1) aspirating] *transferring a* diluent into a [single, disposable,] syringe[, the syringe being made of a material that is non-toxic to bovine sperm];

[(2)] positioning an adaptor between [the] *said* syringe and a [reduced sperm count] semen straw to facilitate [aspiration of the reduced sperm count] *combining* semen [into contact] *from said semen straw* with [the] *said* diluent [in the syringe forming] *to form* an insemination solution within [the] *said* syringe[with the diluent];

[(3)] attaching [the] *said* syringe to a one-piece[hollow, elongate], straight, rigid, metal pipette having a constant diameter along its length, [a longitudinal axis extending along its length,] and a *passageway extending between* proximal and distal [end, the] *ends said* distal end [of the metal pipette being rounded and] including no outlet port on [the] *a* longitudinal axis of [the] *said* pipette[at its distal end but], *said distal end* including only at least one [transverse] outlet port [formed in close proximity to the distal end of the pipette, the at least one outlet port being] transverse to [the] *said* longitudinal axis[of the pipette];

[(4)] inserting [the] *said* distal end of [the] *said* pipette [sequentially through a female bovine's vagina, through the cervix and] into [the] *a* uterus[using rectal palpation]; and

[(5) pumping] *transferring* at least a portion of [the] *said* insemination solution from [the] *said* syringe, through [the] *said* pipette, *and* into [the female bovine] *said uterus*.

2. The method of claim 1, wherein [the] *said* diluent is aspirated from a multi-dose, sterile bag into [the] *said* syringe.

3. The method of claim 1, further comprising achieving fluid communication between [the] *said* syringe and [the] *said* pipette by connecting a luer connector on [the] *said* proximal end of [the] *said* pipette and a luer connector on [the] *said* syringe.

4. The method of claim 1, further comprising establishing fluid communication between [the] *said* syringe and [the] *said* pipette by forcing one end of an elongate elastomeric tube over a luer connector on [one end of the] *said* syringe and by forcing a portion of an opposite end of [the elongate elastomeric] *said* tube over [the] *said* proximal end of [the] *said* pipette.

5. The method of claim 1, wherein [the] *at least a portion of both said* diluent and [the reduced sperm count] *said* semen are [pumped] *transferred* into [the] *said* uterus.

6. The method of claim 1[wherein an additional step is added as follows:], *further comprising:* conducting an ovulation examination prior to insemination to determine which ovary will ovulate*;* and[,]

[pumping substantially all of the diluent and reduced sperm count semen] *transferring said insemination solution* into a corresponding uterine horn[, which will act as a conduit to transport sperm to fertilize an egg].

7. The method of claim 1, wherein [the] *said* pipette [has] *comprises* an outside diameter of [less] *not greater* than 0.134 inches.

8. The method of claim 1, wherein [the reduced sperm count] *said* semen [is] *are* sex sorted.

9. The method of claim 1, wherein [the reduced sperm count] *said* semen [is] *are* unsorted.

[10. A catheter free, speculum free, non-surgical method for artificial insemination of a female bovine comprising the following steps:

(1) aspirating diluent into a single, disposable, syringe, the syringe being made of a material that is non-toxic to bovine sperm;

(2) positioning an adaptor between the syringe and at least one semen straw having a conventional sperm count to facilitate aspiration of the sperm count semen into contact with the diluent in the syringe forming an insemination solution within the syringe with the diluent;

(3) attaching the syringe to a one-piece hollow, elongate, straight, rigid metal pipette having a constant diameter along its length, a longitudinal axis extending along its length, and a proximal and distal end, the distal end of the metal pipette being rounded and including no outlet port on the longitudinal axis of the pipette at its distal end but including only at least one transverse outlet port formed in close proximity to the distal end of the pipette, the at least one outlet port being transverse to the longitudinal axis of the pipette;

(4) inserting the distal end of the pipette sequentially through a female bovine's vagina, through the cervix and into the uterus using rectal palpation; and (5) pumping at least a portion of the insemination solution from the syringe through the pipette into the female bovine.]

[11. The method of claim 10 wherein the conventional sperm count semen is sex sorted.]

[12. The method of claim 10 wherein the conventional sperm count semen is unsorted.]

13. [A catheter free, speculum free] *An* instrument for artificial insemination[of a female bovine with a cervix and a uterus, the instrument sized and arranged to receive a liquid diluent and semen, the instrument], comprising:

a [single, disposable] syringe [having a proximal and a distal end, the syringe being made of a material that is non-toxic to bovine sperm and being sized and arranged to hold the liquid diluent and semen] *sized to contain an insemination solution comprising a diluent and semen*;

a [single,] one-piece, [hollow, elongate,] straight, rigid, metal pipette having a constant diameter along its length, [a longitudinal axis extending along its length, a proximal end and a distal end, the distal end formed integral with the pipette and having a smooth rounded shape to facilitate insertion through the female bovine's cervix and into the uterus, the pipette defining] *and* a passageway [from the] *extending between* proximal [end to the] *and* distal [end of the pipette and] *ends, said distal end* including no outlet port on [its] *a* longitudinal axis [at its distal end but] *of said pipette, said distal end* including only at least one [transverse] outlet port [formed proximate the distal end of the pipette, the at least one outlet port being] transverse to [the] *said* longitudinal axis[of the pipette, an outside diameter of the pipette being less than 0.134 inches, the pipette being removably attachable to the single disposable syringe]; and means to achieve a [fluid tight] *fluid-tight* connection between [the distal end of the] *said* syringe and [the proximal end of the] *said* pipette to [allow the liquid diluent and the semen in the syringe to flow] *facilitate transfer of said insemination solution* from [the] *said* syringe, through [the] *said* pipette, and out [the at least one transverse] *said* outlet port.

*14. The method of claim 1, wherein said semen straw has a conventional sperm count.*

*15. The method of claim 1, wherein said semen straw has a reduced sperm count.*

*16. The method of claim 1, further comprising artificially inseminating said bovine.*

*17. The method of claim 1, wherein said distal end of said pipette comprises a rounded distal end.*

*18. The method of claim 1, wherein said semen from said semen straw are transferred into said syringe via aspiration.*

*19. The instrument of claim 13, wherein said semen are sex-sorted.*

*20. The instrument of claim 13, wherein said semen are unsorted.*

*21. A method for artificial insemination, comprising:*

*combining semen from a semen straw with an amount of diluent to form an insemination solution within a container;*

*coupling a proximal end of a one-piece, straight, rigid, metal pipette to said container via an adapter;*

*said pipette having a constant diameter along its length, and a passageway extending between proximal and distal ends;*

*said distal end including no outlet port on a longitudinal axis of said pipette, said distal end including only at least one outlet port transverse to said longitudinal axis;*

*inserting a distal end of said pipette into the reproductive system of a female bovine; and*

*transferring at least a portion of said insemination solution from said container to said reproductive system of said female bovine.*

* * * * *